(12) United States Patent
Sato (10) Patent No.: US 8,657,437 B2
(45) Date of Patent: Feb. 25, 2014

(54) BAR CODE PRINTING DEVICE AND BAR CODE PRINTING METHOD

(75) Inventor: Syuji Sato, Tokyo (JP)

(73) Assignee: Oki Data Corporation, Tokyo (JP)

(*) Notice: Subject to any disclaimer, the term of this patent is extended or adjusted under 35 U.S.C. 154(b) by 154 days.

(21) Appl. No.: 13/300,945

(22) Filed: Nov. 21, 2011

(65) Prior Publication Data

US 2012/0133720 A1  May 31, 2012

(30) Foreign Application Priority Data

Nov. 30, 2010 (JP) ................................. 2010-267629

(51) Int. Cl.
*B41J 2/01* (2006.01)
*B41J 3/00* (2006.01)

(52) U.S. Cl.
USPC .......................................... 347/107; 347/104

(58) Field of Classification Search
None
See application file for complete search history.

(56) References Cited

U.S. PATENT DOCUMENTS

2009/0072035 A1* 3/2009 Ota ......................... 235/462.16

FOREIGN PATENT DOCUMENTS

JP  A-2008-3994  1/2008

* cited by examiner

*Primary Examiner* — Stephen Meier
*Assistant Examiner* — Alexander C Witkowski
(74) *Attorney, Agent, or Firm* — Muncy, Geissler, Olds & Lowe, PLLC (57) ABSTRACT

A bar code printing device that prints print data including a bar code that has bars arranged in parallel in a main scan direction and spaces therebetween includes: a decoder that detects a point of change from a bar to a space based on bar code position information that indicates a position of the bar code in the print data and a data value for each line in the print data; and a data transfer part that moves up timing for outputting a drive signal for printing a bar immediately preceding the space and that outputs the drive signal, if the decoder detects the point of change from the bar to the space in the bar code.

19 Claims, 14 Drawing Sheets

BAR CODE PRINTING DEVICE AND BAR CODE PRINTING METHOD

CROSS REFERENCE TO RELATED APPLICATION

The present application is related to, claims priority from and incorporates by reference Japanese patent application No. 2010-267629, filed on Nov. 30, 2010.

TECHNICAL FIELD

This application relates to a bar code printing device that prints data including a bar code, and in particular, that prints a bar code in which bars are arranged in parallel in a main scan direction. Also, this application relates a bar code printing method that is used in a printing device.

BACKGROUND

Figure 11:
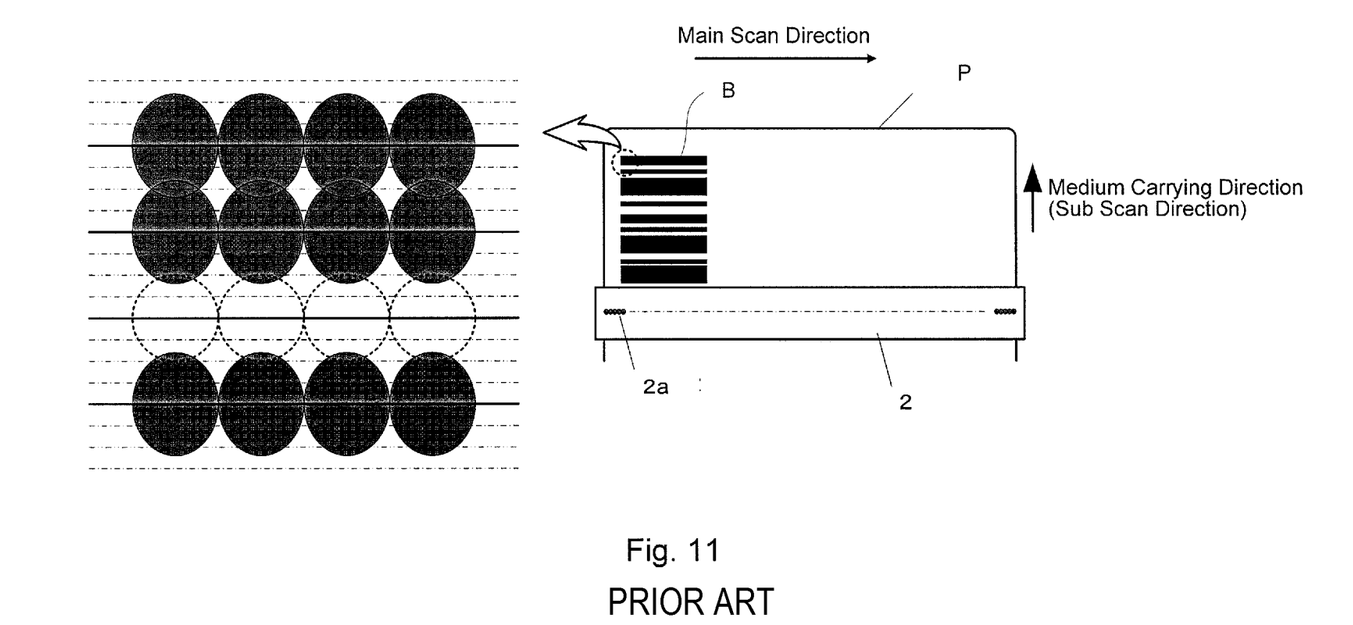
FIG. 11 is an explanatory diagram illustrating a conventional method for printing a bar code.

Conventionally, when a bar code in which bars are arranged in parallel in the scan direction (vertical bar code) is printed by a thermal printer, the bar code is printed by heating heat generating bodies arranged linearly at the position of the bars while the print medium is moved in a sub scan direction. The printing is performed by coloring a thermal paper using a thermal method or by melting and thermally transferring ink on an ink ribbon to a print medium using a thermal transfer method. FIG. 11 illustrates a conventional method for printing a bar code.

In FIG. 11, the right side illustrates a print medium P and a thermal head 2 equipped on a thermal printer, and the left side illustrates an enlargement of a print result. Heat generating elements 2a are linearly provided on the thermal head 2. The print medium P is carried in the sub scan direction, and a bar code B is printed on the left side of the print medium P. The bar code B is printed in parallel in the main scan direction by heating the corresponding heat generating elements on the thermal head 2 while moving the print medium P in the sub scan direction. When there is a space in the bar code B, a gap is obtained as a space by not printing a linear area, as shown by white circles on the left side. As conventional technology, Japanese Laid-Open Patent Application No. 2008-3994 discloses a device that prints such a bar code.

Figure 12:
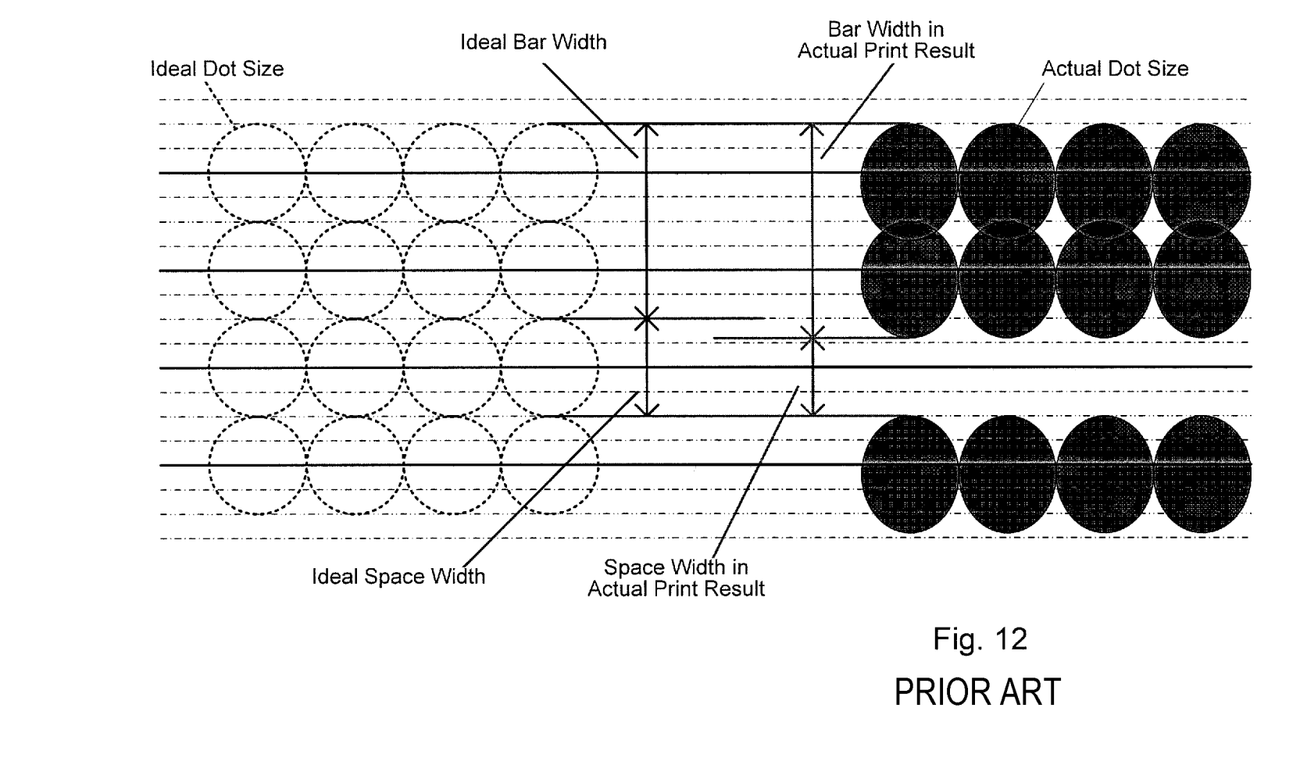
FIG. 12 is an explanatory diagram illustrating conventional bar code printing.

However, in the above-described conventional bar code printing, a so-called tailing phenomenon occurs, in which the dots stretch in the sub scan direction. This phenomenon is explained using FIG. 12, which is an explanatory diagram illustrating conventional bar code printing. The left side illustrates an ideal print result in the bar code printing, and the right side illustrates an actual print result by a thermal printer. In FIG. 12, the printing is performed by heating the heat generating elements inside a thermal head in a thermal printer. At this time, because the print medium is carried in the sub scan direction (direction of arrow A), the heat from the heat generating elements that were heated for printing the bars does not decrease even in spaces, causing the dots to stretch in the sub scan direction (direction to the space). This is the so-called trailing phenomenon. This trailing phenomenon has an advantage that that when a vertical frame is printed, the dots form vertical lines. However, when a bar code is printed, there is a problem that distortion occurs in a ratio of a bar width and a space width, and thereby a rank (e.g. important level) of the bar code drops or, in the worst case of scenario, the bar code becomes unreadable.

The present application has an object to provide a bar code printing device that realizes bar code printing in which the ratio of the bar width and the space width is made appropriate by preventing the trailing phenomenon at the time of printing the bar code.

SUMMARY

Considering the above objects, a bar code printing device of the application that prints print data including a bar code that has bars arranged in parallel in a main scan direction and spaces therebetween includes: a decoder that detects a point of change from a bar to a space based on bar code position information that indicates a position of the bar code in the print data and a data value for each line in the print data; and a data transfer part that moves up timing for outputting a drive signal for printing a bar immediately preceding the space and that outputs the drive signal, if the decoder detects the point of change from the bar to the space in the bar code.

In another view, a bar code printing device of the present invention that prints print data including a bar code that has bars arranged in parallel in a main scan direction and spaces therebetween includes: a decoder that detects at least one of a point of change from a bar to a space based on bar code position information that indicates a position of the bar code in the print data, and a data value for each line in the print data and a 1-dot width bar in the bar code based on bar code position information that indicates the position of the bar code in the print data and the data value for each line in the print data; and a data transfer part that moves up timing for outputting a drive signal for printing a bar immediately preceding the space and outputs the drive signal, if the decoder detects the point of change from the bar to the space in the bar code, and that shortens an output time of the drive signal for printing the 1-dot width bar and outputs the drive signal if the decoder detects the 1-dot width bar in the bar code.

In another view, this application discloses a bar code printing method for a printing device, including: receiving print data from a host device; detecting at least one of a point of change from a bar to a space and a 1-dot width bar in the bar code, based on bar code position information that indicates a position of the bar code in the print data and a data value for each line in the print data; moving up timing for outputting a first drive signal for printing a bar immediately preceding the space if a data value of a line before the bar immediately preceding the space indicates a bar and the point of change from a bar to a space is detected; shortening an output time of a second drive signal for printing the 1-dot width bar and outputting the drive signal if the 1-dot width bar in the bar code is detected; and printing the bar code on a print medium based on the first and second drive signals.

Accordingly, a bar code printing device is provided in which the trailing phenomenon at the time of printing the bar code is prevented and which realizes bar code printing in which the ratio of the bar width and the space width is made appropriate.

DETAILED DESCRIPTION

Figure 1:
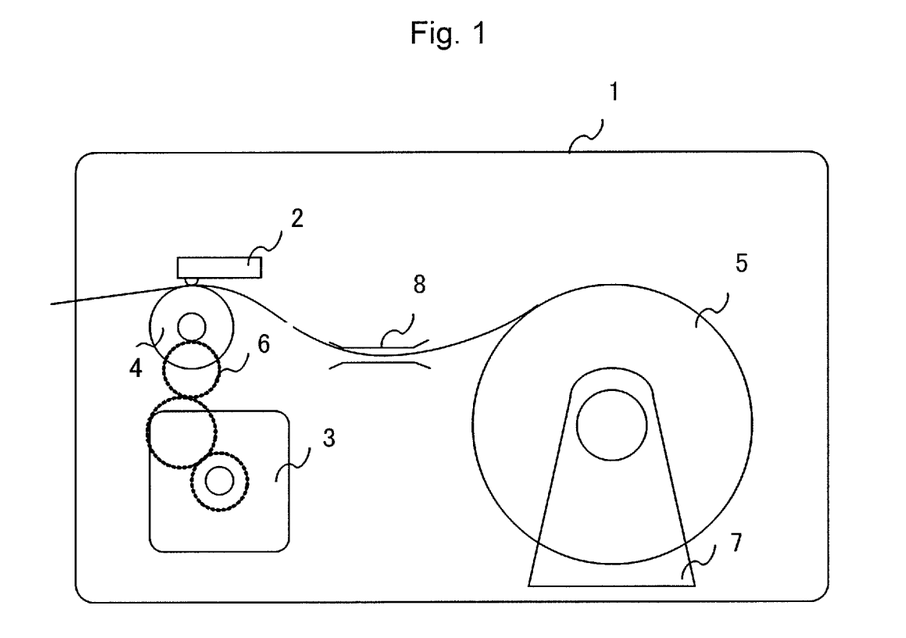
FIG. 1 is a schematic block diagram illustrating a thermal printer of a first embodiment.
Figure 2:
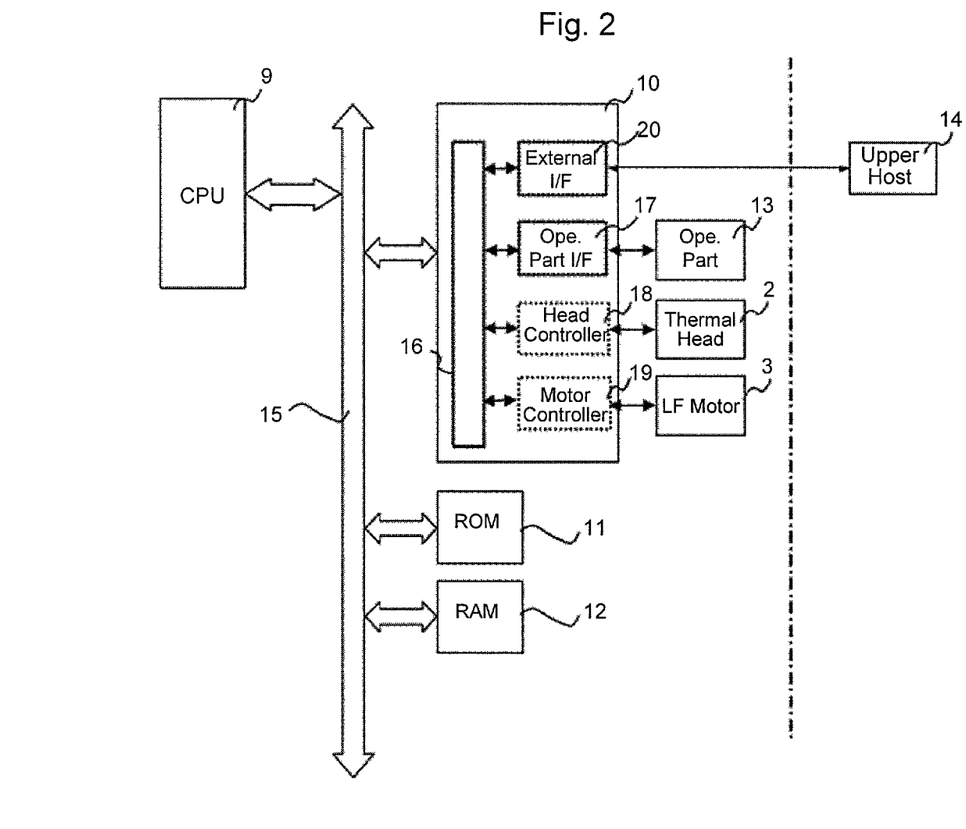
FIG. 2 is a circuit block diagram illustrating a control system of the first embodiment.

Embodiments of the present application are explained below with reference to the drawings. FIG. 1 is a schematic block diagram illustrating a thermal printer of a first embodiment, and FIG. 2 is a circuit block diagram illustrating a control system of the first embodiment. In the embodiments explained below, a thermal printer that uses thermal paper is explained as an example of a bar code printing device.

First Embodiment

In FIG. 1, in a thermal printer 1 of a first embodiment, a thermal head 2, a line feed (LF) motor 3, a platen 4, a print medium 5, a gear array 6, a roll paper holder 7 and a sheet guide 8 are provided. The thermal head 1 includes heat generating elements arranged in a main scan direction and applies heat from the heat generating elements to the print medium 5. The platen 4 is provided rotatably as being pressed against the thermal head 2 with the print medium 5 being sandwiched therebetween. The print medium 5 is carried by the rotation of the platen 4.

The platen 4 is rotated by the line feed motor 3 via the gear array 6. The print medium 5 is carried in an ejection direction or the opposite direction based on the rotational direction of the line feed motor 3. The print medium 5 is rotatably supported by the roller paper holder 7 and is set so as to be guided by the sheet guide 8 and inserted between the thermal head 2 and the platen 4.

In FIG. 2, a central processing unit (CPU) 9 controls an entire operation of the thermal printer 1 and is connected to a large-scale integrated circuit (LSI) 10, a read-only memory (ROM) 11 and a random access memory (RAM) 12 through a control signal bus 15. The ROM 11 stores a control program. The RAM 12 stores data and the like needed for operation. The CPU 9 accesses the ROM 11 and receives a program written in the ROM 11. The CPU 9 also accesses the RAM 12 and sends and receives data to and from the LSI 10 and the RAM 12. The CPU 9 further sends information as to whether or not a vertical bar code is included, and if so, sends information (bar code position information) that indicates the position of the bar code in print data, to the LSI 10 at the time of printing.

The LSI 10 includes a bus interface (IF) 16, an operation part interface (IF) 17, a head controller 18, a motor controller 19, and an external interface (IF) 20. The LSI 10 sends and receives data to and from the CPU 9 through the control signal bus 15 and the bus IF 16. The external IF 20 is connected to an upper host 14. The operation part IF 17 is connected to an operation part 13. The head controller 18 is connected to the thermal head 2. The motor controller 19 is connected to the line feed motor 3.

The LSI 10 controls data transmission and reception with the upper host 14 through the external IF 20. In addition, the LSI 10 controls switching operation and light illumination operation of the operation part 13 performed by an operator via the operation part IF 17. Moreover, the LSI 10 controls the thermal head 2 via the head controller 18 and controls the LF motor 3 via the motor controller 19.

Figure 3:
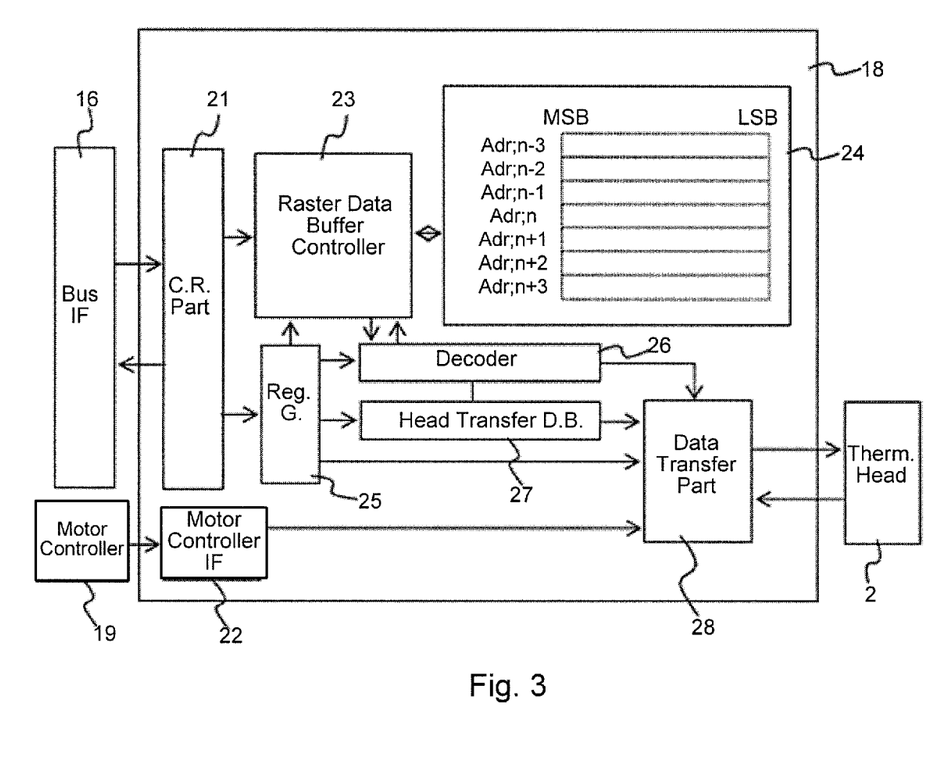
FIG. 3 is a block diagram illustrating a head controller of the first embodiment.

FIG. 3 is a block diagram illustrating the head controller of the first embodiment. In FIG. 3, the head controller 18 includes a command receiving part 21, a motor controller interface (IF) 22, a raster data buffer controller 23, a raster data buffer 24, a register group 25, a decoder 26, a head transfer data buffer 27 and a data transfer part 28. The command receiving part 21 is connected to each part inside and outside of the head controller 18. The command receiving part 21 decodes data received from the bus IF 16 and accesses necessary parts to read and write data.

The motor controller IF 22 controls operation of the line feed motor 3 and sends to the data transfer part 28 information that becomes a trigger for the print timing, such as an excitation phase switching cycle of the line feed motor 3. The raster data buffer controller 23 is a first-in-first-out (FIFO) controller. The raster data buffer controller 23 controls an access address for the raster data buffer 24 based on a setting content written in the register group 25 and reads and writes, from and to the raster data buffer 24, the print data received from the CPU 1 and the like through the command receiving part 21. The read data is sent to the decoder 26 in accordance with a request from the decoder 26.

The raster data buffer 24 is configured from a readable/writable memory, such as a dynamic RAM (DRAM), to which the print data is written. The register group 25 stores data, such as control parameters for each block, including a control block (not shown). The register group 25 sends to the decoder 26 bar code position information that indicates the position of the bar code in the print data sent from the CPU 9 and the like and sends to the data transfer part 28 a vertical bar code flag that indicates that a vertical bar code is included in the print data.

The decoder 26 sequentially reads out the stored print data by designating a print line to the raster data buffer controller 23 based on the information written in the register group 25. The decoder 26 at this time recognizes which position of data in the print data was read by the designated line and notifies the data transfer part 28 if the data position matches the bar code position information. In addition, when a heat history control is performed, the decoder 26 corrects the data based on the information written in the register group 25 and transfers the data to the head transfer data buffer 27.

The head transfer data buffer 27 sequentially sends data received from the decoder 26 to the data transfer part 28. The data transfer part 28 sends the data sent from the head transfer data buffer 27 to the thermal head 2 and outputs a strobe signal (drive signal) in response to the print timing received from the motor controller IF 22. Moreover, when there is a vertical bar code flag, the data transfer part 28 changes the output timing of the strobe signal.

Figure 4:
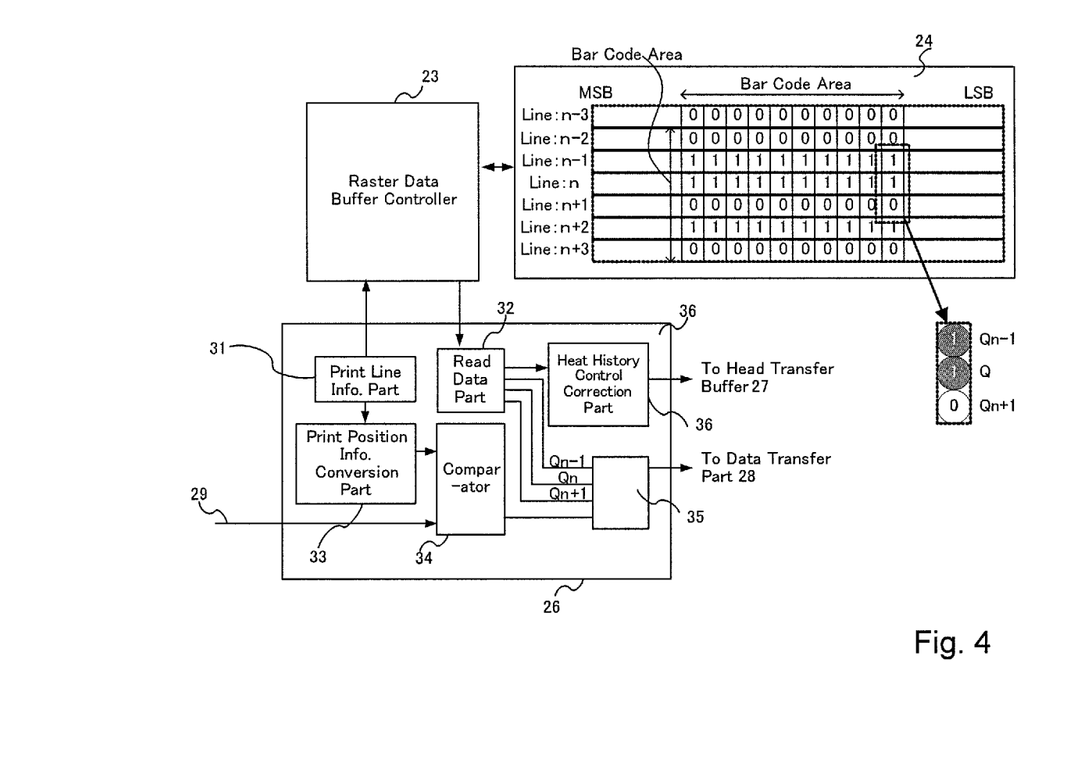
FIG. 4 is a block diagram illustrating a detailed configuration of a decoder of the first embodiment.

FIG. 4 is a block diagram illustrating a detailed configuration of the decoder of the first embodiment. In FIG. 4, the decoder 26 includes a print line information part 31, a read data part 32, a print position information conversion part 33, a comparator 34, a bar/space determination circuit 35 and a heat history control correction part 36. The print line information part 31 increments the line desired for reading based on a print start trigger (not shown). The raster data buffer controller 23 reads out data from the raster data buffer 24 based on the line incremented by the print line information part 31 and transfers the read data to the decoder 26. The print line information from the print line information part 31 is also sent to the print position information conversion part 33. The information received by the print position information conversion part 33 is converted into a value comparable with the bar code position information. The converted data is sent to the comparator 34.

The read data part 32 includes a buffer for holding data of three or more print lines. The read data part 32 reads out the same bit values of continuous addresses in the raster data buffer 24 and sends the read-out data to the heat history control correction part 36. The comparator 34 compares the bar code position information sent from the register 25 shown in FIG. 3 and a print position information conversion value from the print position information conversion part 33. When the bar code position information and the print position information conversion value match, a bar code match flag is outputted to the bar/space determination circuit 35.

The bar/space determination circuit 35 compares a data value Qn of the n-th print line, a data value Q(n−1) of the preceding print line and a data value Q(n+1) of the subsequent print line. Where the read data "1" indicates a dot to be printed and where the read data "0" indicates a dot not to be printed, if Qn and Q(n−1) are "1" and if Q(n+1) is "0," and also if the print data at these lines is the data at the print position of the bar code, the bar/space determination circuit 35 determines that the n-th print line is a point where a bar changes to a space and sends the information to the data transfer part 28. The heat history control correction part 36 adds necessary heat history control correction to the data received from the read data part 32 and sends the data to the transfer data buffer 27.

Speaking of the heat history control, the heat history control is performed by heating the heat generating elements of the thermal head. At that time, the temperature of the heat generated is affected from the heat accumulated at the heated elements themselves and the heat from other heat generating elements. The control that applies appropriate print energy to the heat generating elements in view of these effects is called heat history control.

Figure 5:
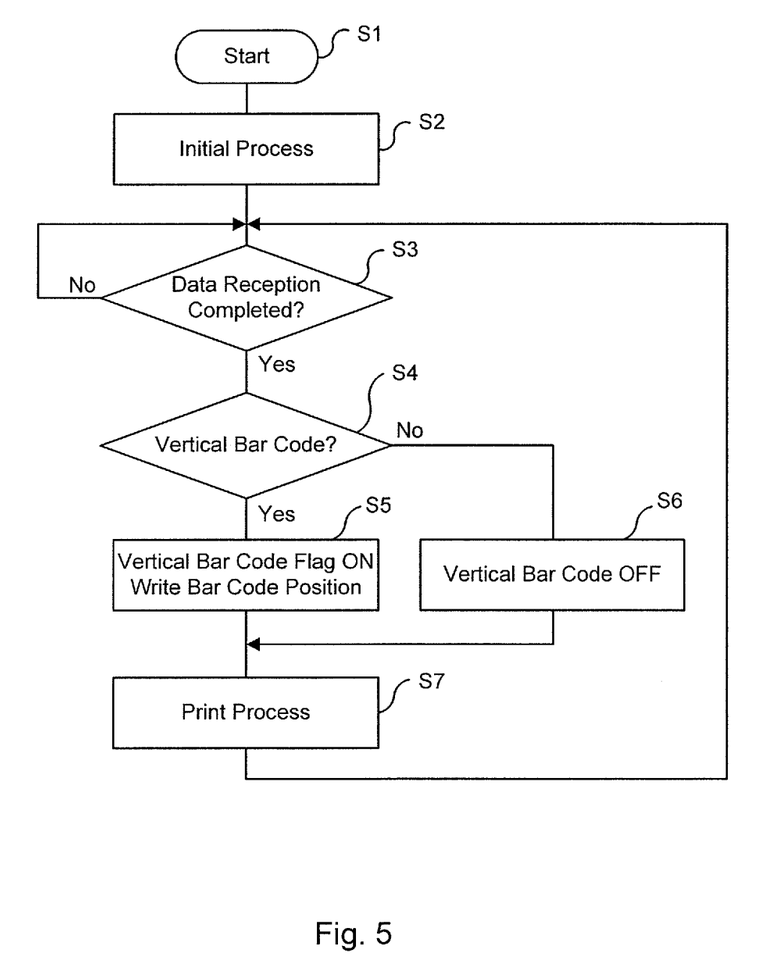
FIG. 5 is a flow diagram illustrating an operation of the thermal printer of the first embodiment.

Next, the operation of the first embodiment is explained. FIG. 5 is a flow diagram illustrating an operation of the thermal printer of the first embodiment. When the operator turns on the thermal printer 1 (S1), the thermal printer 1 performs an initial process (S2) and turns into a data reception standby state. When print data is sent from the upper host 14, the print data is received. When the reception is completed (S3), a check is performed to determine whether or not a bar code in the vertical direction (bar code shown in FIG. 9 and explained as conventional technology in which bars are in parallel in the main scanning direction) is present in the received print data (S4). If a vertical bar code is present, a vertical bar code flag in the register group 25 of the head controller 18 is turned to ON, and bar code position information is written in the register group 25 (S5). If the vertical bar code is not present, the vertical bar code flag is turned to OFF (S6), and the process moves to a print process (S7). After completion of the print process, the step returns to S3 again and turns the thermal printer 1 into a print data reception standby state.

Figure 6A:
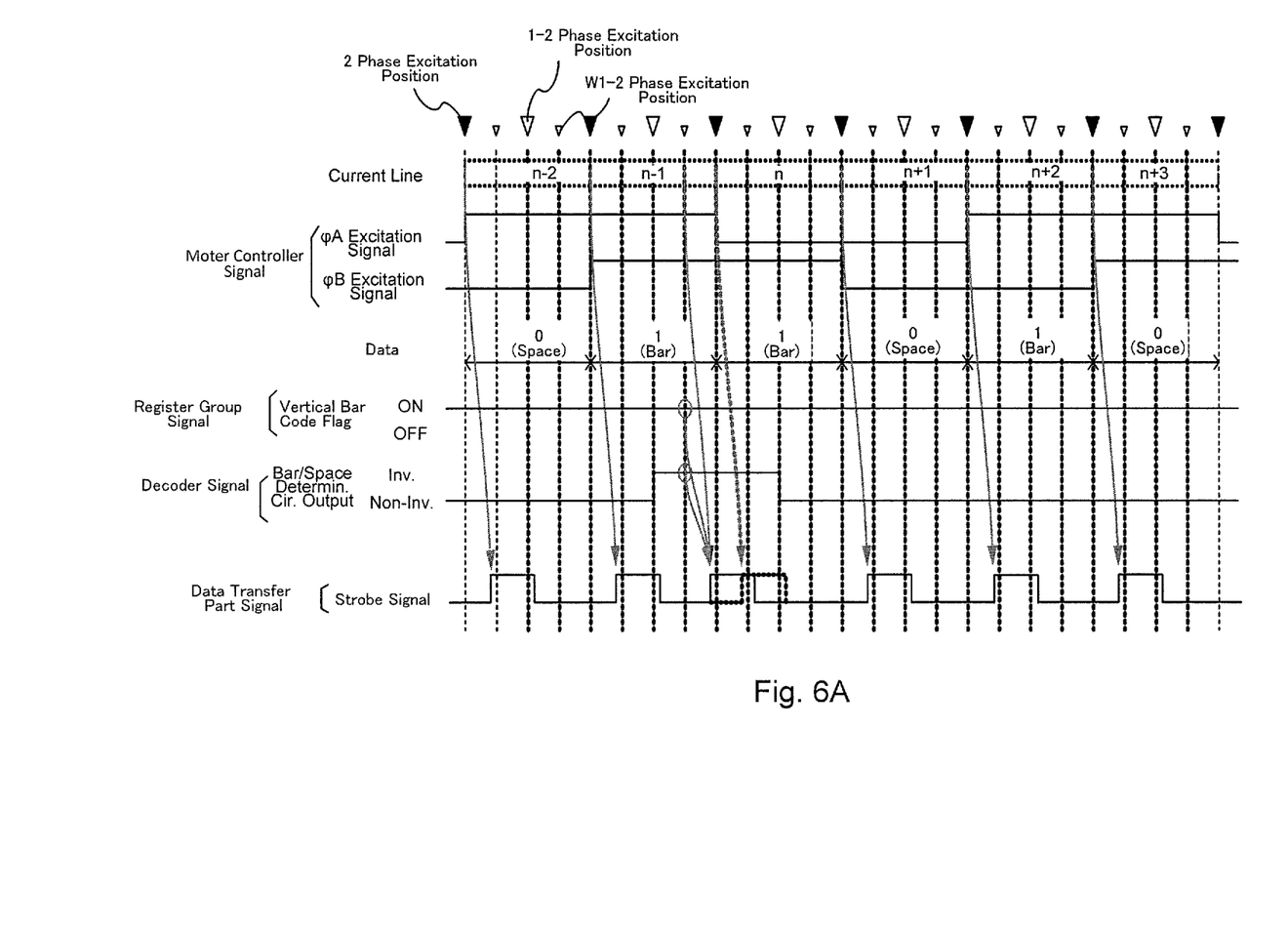
FIGS. 6A and 6B are timing diagrams illustrating a print operation of the first embodiment.
Figure 6B:
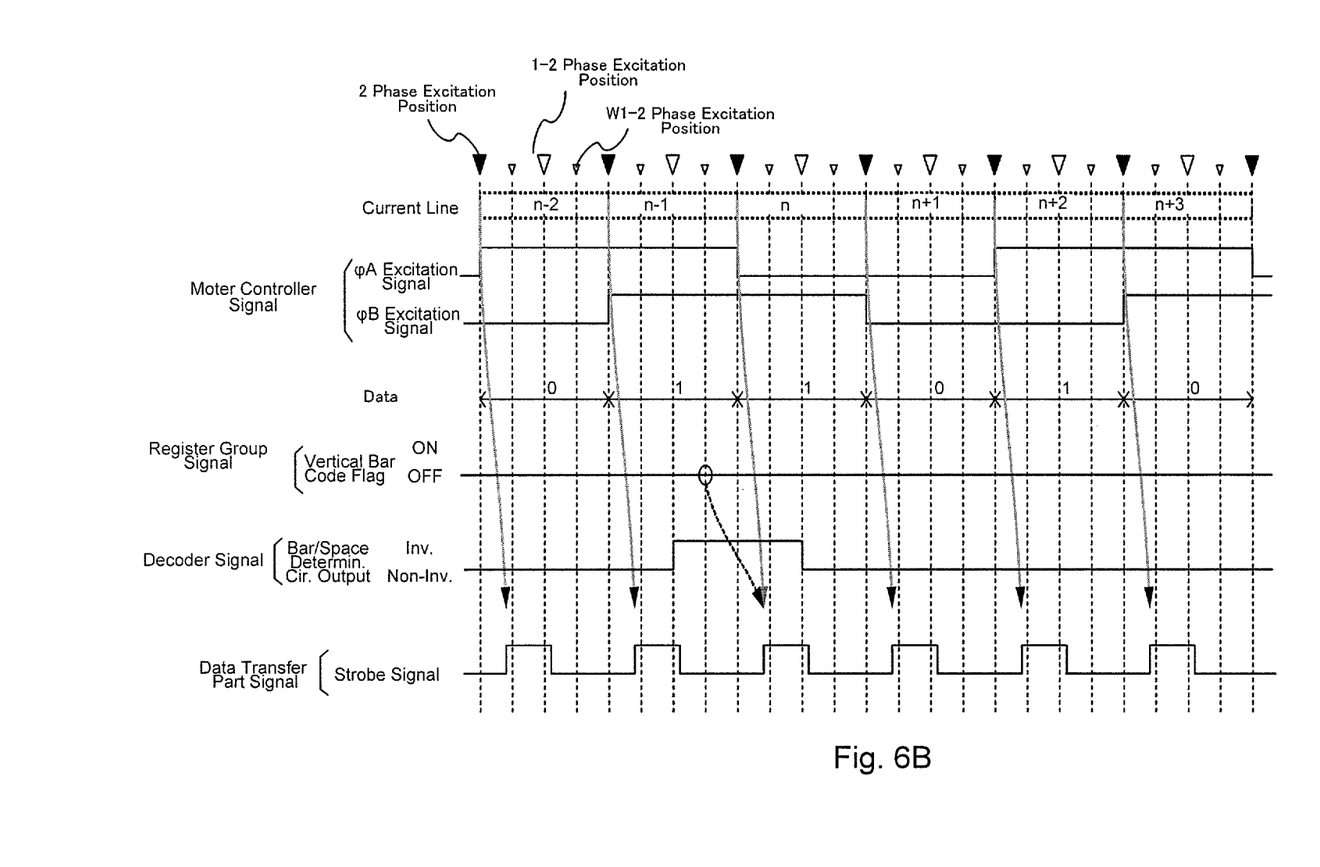
Figure 7A:
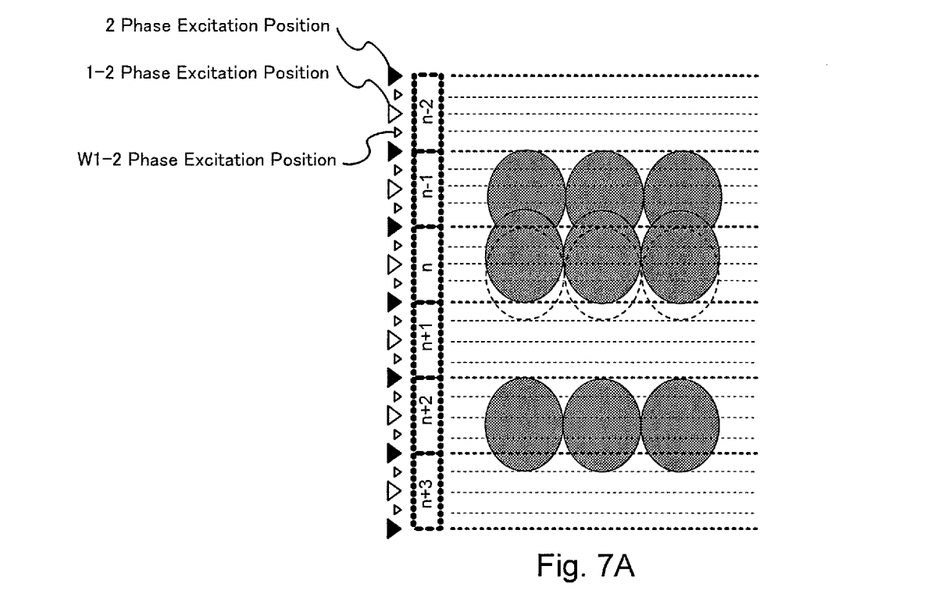
FIGS. 7A and 7B are explanatory diagrams illustrating a print result in the first embodiment.
Figure 7B:
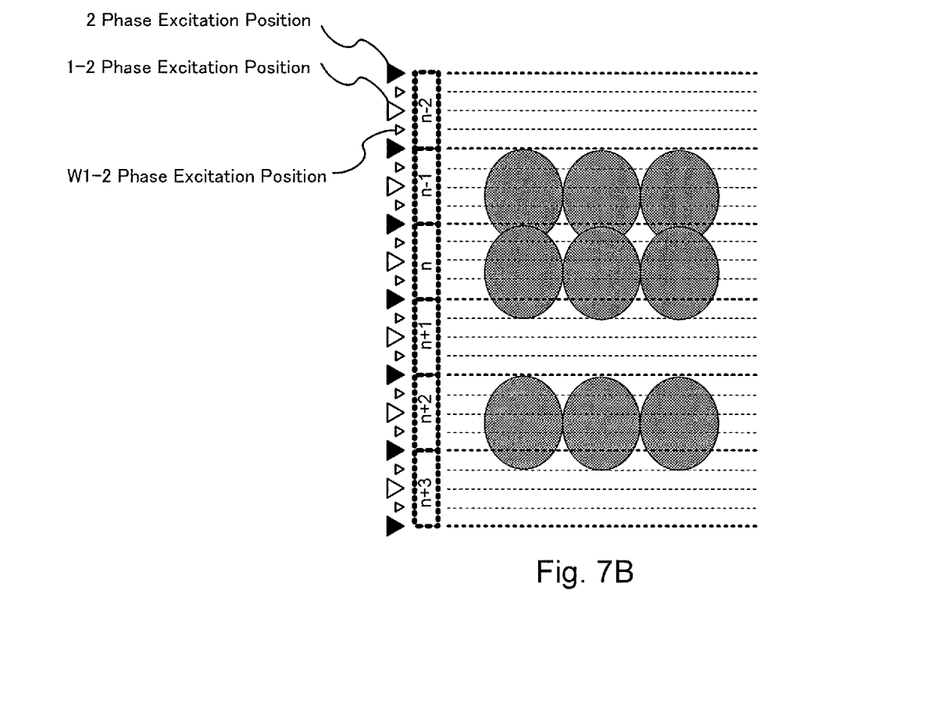

FIGS. 6A and 6B are timing diagrams illustrating a print operation of the first embodiment. FIG. 6A illustrates an operation when the vertical bar code flag is ON, and FIG. 6B illustrates an operation when the vertical bar code flag is OFF. FIGS. 7A and 7B are explanatory diagrams illustrating print results in the first embodiment. FIG. 7A illustrates a print result when the vertical bar code flag is ON, and 7B illustrates a print result when the vertical bar code flag is OFF.

In FIG. 6A, 2-phase excitation signals (φA excitation signal and φB excitation signal) are outputted from the motor controller 19, and the print data ("1" for a bar and "0" for a space) is outputted at each switching of the phases. A vertical bar code flag signal is outputted from the register group 25. In the case shown in FIG. 6A, a signal that indicates the flag (ON) is outputted. Moreover, an inversion/non-inversion signal is outputted from the bar/space determination circuit 35 of the decoder 26. The bar/space determination circuit 35 outputs High, by which the inversion/non-inversion signal indicates an inversion, when a determination is made that a space comes after a bar. The timing of the output is at a 1-2 phase excitation position of a bar before the bar preceding the space. The inversion signal is outputted when the line before the bar preceding the space is a bar, and the non-inversion signal is outputted in the other cases. The strobe signal outputted from the data transfer part 28 is outputted at predetermined timing from the 2-phase excitation position.

In the case shown in FIG. 6A, a vertical bar code flag ON is outputted from the register group 25. To print the n-th line, the decoder 26 looks at the data of the (n+1)th line and the (n+1)th line in the print data designated at the bar code position. If the decoder 26 detects that the data indicates that a bar inverses to a space between the n-th line and the (n+1)th line, that is, if the decoder 26 detects that a space comes after a bar, the bar/space determination circuit 35 outputs a signal that indicates an inversion at the 1-2 excitation position of the (n−1)th line.

The data transfer part 28 changes the output timing of the strobe signal if a vertical code flag ON signal and the bar/space inversion signal are outputted. This change is performed by designating the register group 25 in advance to output the strobe signal at certain timing. In the case of the present embodiment, normally if a phase switching position for a 2-phase excitation is referenced, the output timing is changed to a w1-2 phase excitation, which is ¼ step preceding the (n−1)th line. Therefore, by moving up the output timing for the strobe signal, that is, the print timing, at a position where a bar changes to a space, the print position of the n-th line becomes higher than the other lines as shown in FIG. 7A (to the upper direction of the sheet of FIG. 7A). As a result, coloring in the space in the (n+1)th line due to the trailing phenomenon is prevented. The dots shown by broken lines in FIG. 7A indicate the conventional print position of the n-th line.

FIG. 6B shows an operation when a vertical bar code is not included in the print data. In the figure, the vertical bar code flag outputted from the register group 25 is OFF. In addition, a signal that indicates an inversion from a bar to a space is outputted from the bar/space determination circuit 35. This situation occurs when the previous bar code position data remains in the decoder 26, that is, when a determination is made that the data for the bar code indicates that a bar inverts and becomes a space. In this situation, because the vertical bar code flag is OFF when the n-th line is printed, the strobe signal is not moved up, and the output is made at the normal timing. The print result is shown in FIG. 7B. As shown in the figure, the print position of the n-th line is at the normal print position.

As described above, according to the first embodiment, when a vertical bar code is printed, which is configured by bars arranged in parallel in the main scan direction and spacers therebetween, the position of the bar code is determined from a command, and a point of a change from a bar to a space is detected in the bar code from the position information and the print data. In addition, from the information that indicates the presence of the vertical bar code and a detection signal of the point of change from the bar to the space, the timing for the strobe signal to be outputted is moved up. Therefore, the coloring in the space due to the trailing phenomenon is prevented, thereby allowing security of an appropriate ratio of the bars and spaces.

Second Embodiment

Figure 8:
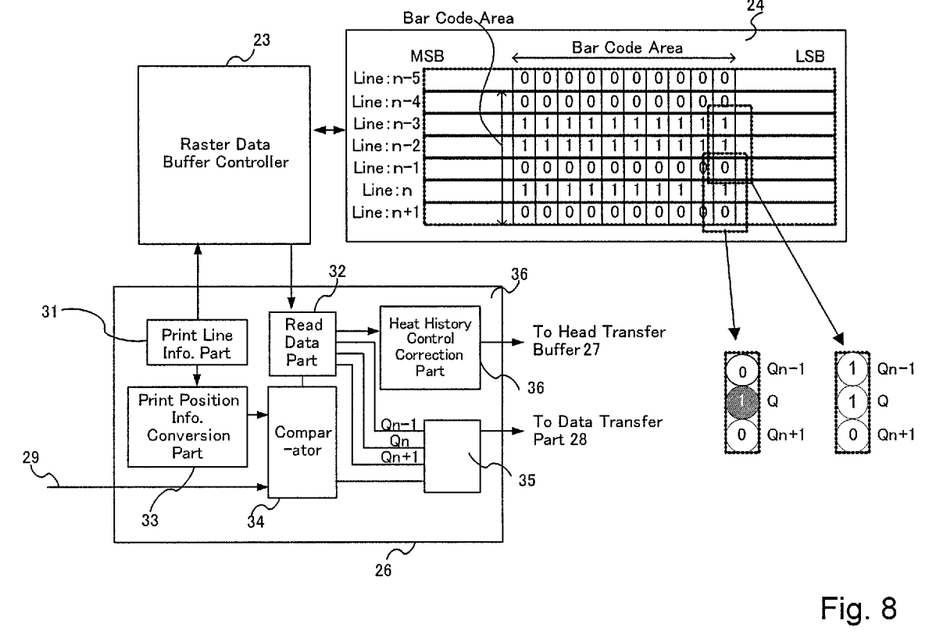
FIG. 8 is a block diagram illustrating a detailed configuration of a decoder of a second embodiment.

Next, a second embodiment of the present application is explained. FIG. 8 is a block diagram illustrating a detailed configuration of the decoder of the second embodiment. In FIG. 8, similar to the first embodiment, the decoder 26 includes the bar/space determination circuit 35. However, the bar/space determination circuit includes a function to compare the print data value Qn for the n-th line, a print data value Q(n−1) of the preceding line, a print data value Q(n+1) of the subsequent line to be printed, to determine 1-dot width data if Q(n−1) and Q(n+1) is "0" (first value) and if Qn is "1" (second value), and to output the determination result to the data transfer part 28. Other configurations are similar to the above-described first embodiment.

Figure 9A:
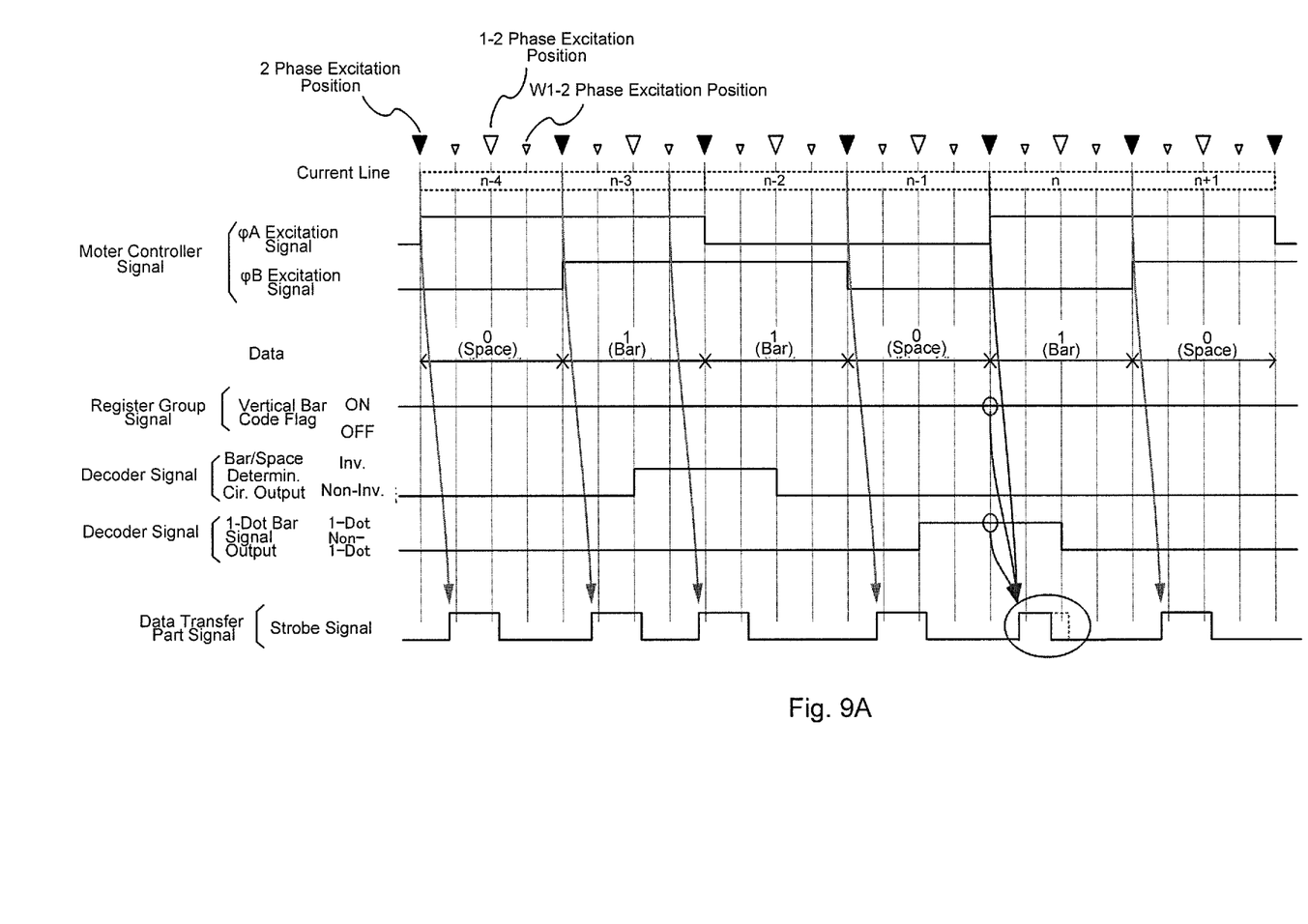
FIGS. 9A and 9B are timing diagrams illustrating a print operation of the second embodiment.
Figure 9B:
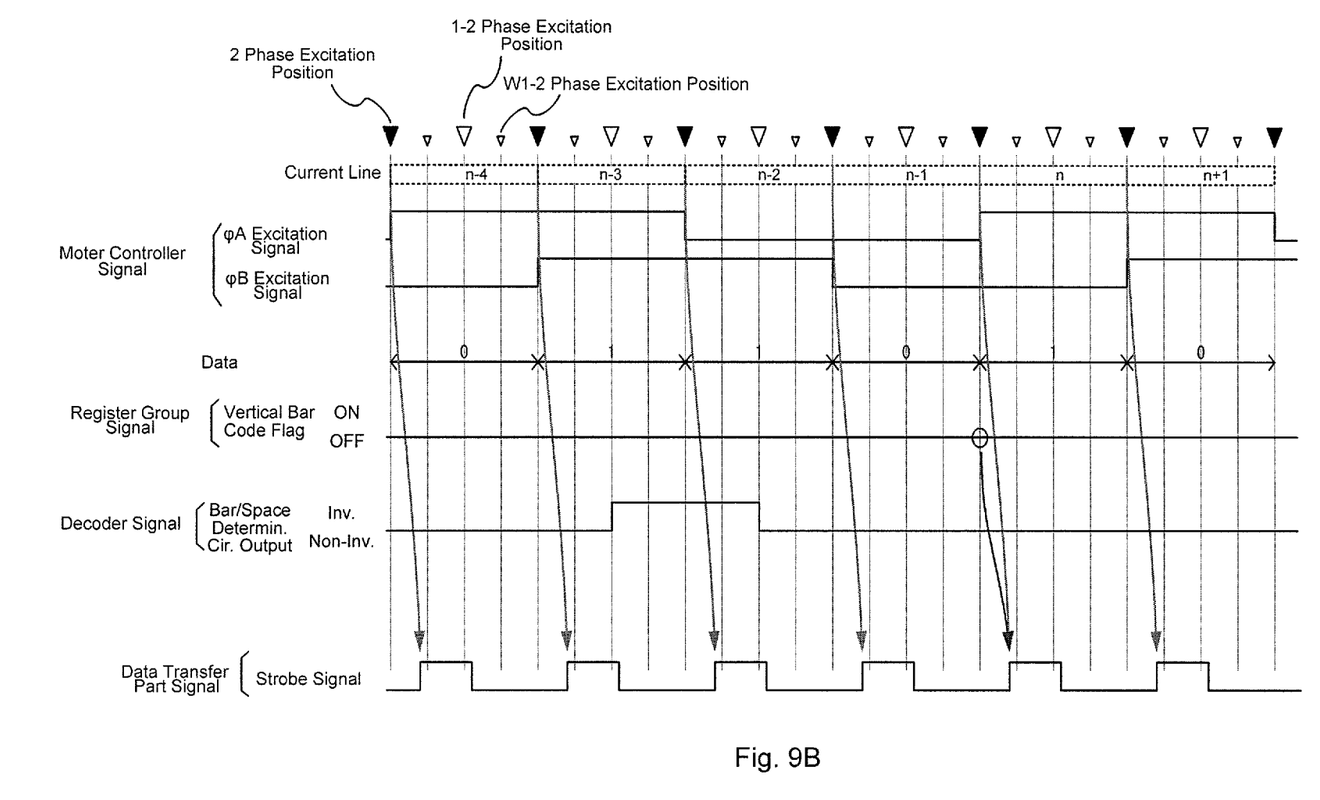
Figure 10A:
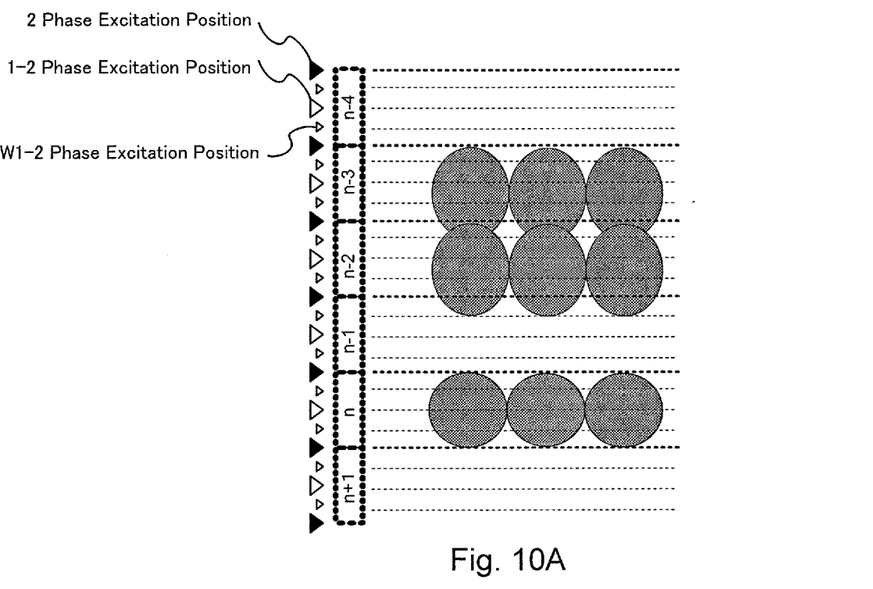
FIG. 10 is an explanatory diagram illustrating a print result in the second embodiment.
Figure 10B:
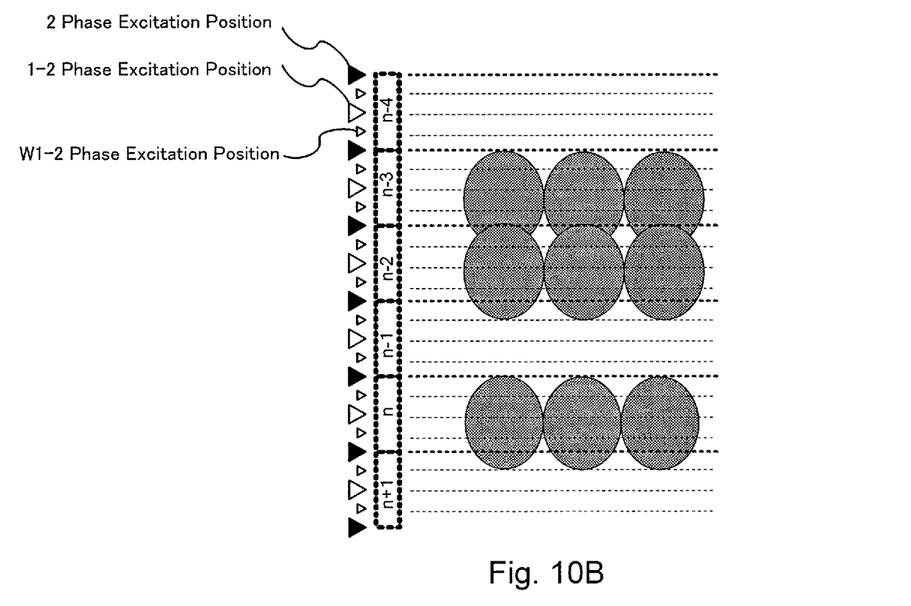

Next, the operation of the second embodiment is explained. FIGS. 9A and 9B are timing diagrams illustrating a print operation of the second embodiment. FIG. 9A illustrates an operation when the vertical bar code flag is ON, and FIG. 9B illustrates an operation when the vertical bar code flag is OFF. FIGS. 10A and 10B are explanatory diagrams illustrating print results in the second embodiment. FIG. 10A illustrates a print result when the vertical bar code flag is ON, and 10B illustrates a print result when the vertical bar code flag is OFF.

In FIG. 9A, a vertical bar code flag ON signal is outputted from the register group 25.

Moreover, an inversion/non-inversion signal is outputted from the bar/space determination circuit 35 of the decoder 26. The bar/space determination circuit 35 outputs High, by which the inversion/non-inversion signal indicates an inversion, when a determination is made that a space comes after a bar. The timing of the output is at a 1-2 phase excitation position of a bar before the bar preceding the space. The strobe signal outputted from the data transfer part 28 is outputted at predetermined timing from the 2-phase excitation position.

In addition, a 1-dot width bar signal is outputted from the bar/space determination circuit 35. To print the n-th line, the decoder 26 looks at the data of the (n+1)th line and the (n+1)th line in the print data designated at the bar code position. If the decoder 26 detects that the data indicates that the n-th line is a bar and that the (n−1)th and (n+1)th lines are spaces, that is, if the decoder 26 detects that the n-th line is a 1-dot width bar, the bar/space determination circuit 35 outputs a 1-dot width bar signal at the 1-2 excitation position of the (n−1)th line.

The data transfer part 28 changes the strobe signal so that output time is shortened if a vertical code flag ON signal and the 1-dot width bar signal are outputted. This change is performed by designating the output time of the strobe signal at the register group 25. As shown in FIG. 9A, the normal output time is indicated by dotted lines, and the present embodiment in which the output time is shortened is indicated by solid lines. Therefore, to print a 1-dot width bar, by shortening the output time of the strobe signal, the width of the 1-dot width bar at the n-th line is reduced as shown in FIG. 10A, thereby preventing the coloring in the space at the (n+1)th line due to the trailing phenomenon.

FIG. 9B shows an operation when a vertical bar code is not included in the print data. In the figure, the vertical bar code flag outputted from the register group 25 is OFF. In addition, a signal that indicates an inversion from a bar to a space is outputted from the bar/space determination circuit 35. This situation occurs when the previous bar code position data remains in the decoder 26, and, when a determination is made that the data indicates a 1-dot width bar. In this situation, because the vertical bar code flag is OFF when the n-th line is printed, the strobe signal is not moved up, and the output is made at the normal output time.

The print result in this situation is shown in FIG. 10B. As shown in the figure, the print position of the n-th line is at the normal print position.

As described above, according to the second embodiment, when a 1-dot width bar in a vertical bar code configured by bars arranged in parallel in the main scan direction and spaces therebetween is printed, the position of the bar code is determined from a command, and the 1-dot width bar is detected from the position information and the print data. In addition, from the information that indicates the presence of the vertical bar code and a detection signal of the 1-dot width bar, the strobe signal is outputted with the output time being shortened. Therefore, the coloring in the space due to the trailing phenomenon is prevented, thereby allowing security of an appropriate ratio of the bars and spaces.

To print a bar immediately preceding a space, the present application moves up the output timing of the strobe signal as described in the first embodiment if the preceding line is a bar. The present application shortens the output time of the strobe signal as described in the second embodiment if the preceding line is a space. To print a bar at the n-th line when the (n−1) line and the n-th line are bars as discussed in the first embodiment, the coloring in the space due to the trailing phenomenon is prevented also by shortening the output time of the strobe signal as discussed in the second embodiment.

However, in a line type thermal printer used in the present application, images and characters may be printed with a bar code. If the output time of the strobe signal is shortened for printing the bar code, the print of the images and characters may be thinned out. By combining the above-described first and second embodiments, the effects to the print of the images and characters may be minimized. Moreover, the degree to which the output timing is moved up or advanced for the strobe signal is not limited to the degree discussed in the first embodiment but may be arbitrarily set to prevent the coloring in spaces.

The present application is explained with respect to a direct thermal type thermal printer that uses thermal paper as an example. The present application may also be appropriately used in a thermal transfer type thermal printer that uses an ink ribbon. Further, the invention is applied not only to specialized bar code printing machines but also common printing machines.

What is claimed is:

1. A bar code printing device that prints print data including a bar code that has bars extending in a direction parallel with a main scan direction and spaces therebetween, comprising:
  a decoder that detects a point of change from a bar to a space based on bar code position information that indicates a position of the bar code in the print data and a data value for each line in the print data; and
  a data transfer part that moves up timing for outputting a drive signal for printing a bar immediately preceding the space and that outputs the drive signal, if the decoder detects the point of change from the bar to the space in the bar code.

2. The bar code printing device of claim 1, wherein
  the data transfer part moves up timing for outputting the drive signal for printing the bar immediately preceding the space and that outputs the drive signal, if the decoder detects that a data value of a line before the bar immediately preceding the space indicates a bar.

3. The bar code printing device of claim 1, wherein
the decoder detects the point of change by determining that n-th and (n−1)th lines of the print data contain the information and that the (n+1)th line of the print data does not contain the information.

4. The bar code printing device of claim 1, wherein
when the decoder detects the point of change, the decoder outputs a signal that indicates the point of change, and
the data transfer part changes the timing for outputting the drive signal based on the signal outputted from the decoder.

5. The bar code printing device of claim 1, wherein
the decoder that detects a 1-dot width bar in the bar code based on bar code position information that indicates the position of the bar code in the print data and the data value for each line in the print data; and
the data transfer part that shortens an output time of the drive signal for printing the 1-dot width bar and outputs the drive signal if the decoder detects the 1-dot width bar in the bar code.

6. The bar code printing device of claim 5, wherein
the data transfer part moves up timing for outputting the drive signal for printing the bar immediately preceding the space and that outputs the drive signal, if the decoder detects that a data value of a line before the bar immediately preceding the space indicates a bar.

7. The bar code printing device of claim 5, wherein
the decoder detects the point of change by determining that n-th and (n−1)th lines of the print data contain the information and that the (n+1)th line of the print data does not contain the information.

8. The bar code printing device of claim 5, wherein
when the decoder detects the point of change, the decoder outputs a signal that indicates the point of change, and
the data transfer part changes the timing for outputting the drive signal based on the signal outputted from the decoder.

9. The bar code printing device of claim 5, wherein
the decoder detects the 1-dot width bar by determining that the print data values for (n−1)th and (n+1)th lines indicate a first value and that the print data value for n-th line indicates a second value.

10. The bar code printing device of claim 5, wherein
when the decoder detects the 1-dot width bar, the decoder outputs a signal that indicates the 1-dot width bar, and
the data transfer part changes the timing for outputting the drive signal based on the signal outputted from the decoder.

11. A bar code printing device that prints print data including a bar code that has bars arranged in parallel in a main scan direction and spaces therebetween, comprising:
a decoder that detects a 1-dot width bar in the bar code based on bar code position information that indicates a position of the bar code in the print data and a data value for each line in the print data; and
a data transfer part that shortens an output time of a drive signal for printing the 1-dot width bar and outputs the drive signal if the decoder detects the 1-dot width bar in the bar code.

12. The bar code printing device of claim 11, wherein
the decoder detects the 1-dot width bar by determining that the print data values for (n−1)th and (n+1)th lines indicate a first value and that the print data value for n-th line indicates a second value.

13. The bar code printing device of claim 11, wherein
when the decoder detects the 1-dot width bar, the decoder outputs a signal that indicates the 1-dot width bar, and
the data transfer part changes the timing for outputting the drive signal based on the signal outputted from the decoder.

14. A bar code printing method for a printing device, comprising:
receiving print data from a host device;
detecting at least one of a point of change from a bar to a space and a 1-dot width bar in the bar code, based on bar code position information that indicates a position of the bar code in the print data and a data value for each line in the print data;
moving up timing for outputting a first drive signal for printing a bar immediately preceding the space if a data value of a line before the bar immediately preceding the space indicates a bar and the point of change from a bar to a space is detected;
shortening an output time of a second drive signal for printing the 1-dot width bar and outputting the drive signal if the 1-dot width bar in the bar code is detected; and
printing the bar code on a print medium based on the first and second drive signals.

15. The bar code printing method of claim 14, wherein
the timing for outputting the drive signal for printing the bar immediately preceding the space and that outputs the drive signal is moved up if a data value of a line before the bar immediately preceding the space indicates a bar.

16. The bar code printing method of claim 14, wherein
the point of change is detected by determining that n-th and (n−1)th lines of the print data contain the information and that the (n+1)th line of the print data does not contain the information.

17. The bar code printing method of claim 14, further comprising:
outputting a signal that indicates the point of change when the detects the point of change is detected, wherein
the timing for outputting the drive signal is changed based on the signal outputted from the decoder.

18. The bar code printing method of claim 14, wherein
the 1-dot width bar is detected by determining that the print data values for (n−1)th and (n+1)th lines indicate a first value and that the print data value for n-th line indicates a second value.

19. The bar code printing method of claim 14, further comprising:
outputting a signal that indicates the 1-dot width bar when the decoder detects the 1-dot width bar, wherein
the data transfer part changes the timing for outputting the drive signal based on the signal outputted from the decoder.

* * * * *